United States Patent [19]

Schöllkopf et al.

[11] Patent Number: 4,498,946
[45] Date of Patent: Feb. 12, 1985

[54] APPARATUS AND METHOD FOR MANUFACTURING A SANDWICH WEB

[75] Inventors: Ernst Schöllkopf, Rechthalten; Walter Rimmele, Fribourg, both of Switzerland

[73] Assignee: Polytype AG, Switzerland

[21] Appl. No.: 526,799

[22] Filed: Aug. 26, 1983

[30] Foreign Application Priority Data

Sep. 24, 1982 [SE] Sweden .............................. 8205481

[51] Int. Cl.$^3$ ............................................. B32B 31/06
[52] U.S. Cl. ................................... 156/324; 156/242; 156/555; 428/354
[58] Field of Search ............... 156/242, 243, 324, 555; 427/208, 209; 428/354, 40

[56] References Cited

U.S. PATENT DOCUMENTS

| 2,566,249 | 8/1951 | Rainey et al. | 156/324 X |
| 3,252,851 | 5/1966 | Benson | 156/324 X |
| 4,055,453 | 10/1977 | Tajima et al. | 156/324 X |
| 4,414,050 | 11/1983 | Bernath | 156/555 X |

Primary Examiner—Robert Dawson
Attorney, Agent, or Firm—McGlew and Tuttle

[57] ABSTRACT

An apparatus for manufacturing a sandwich web comprises first and second rotatable applicator rollers which are mounted so as to form an adjustable first roller nip therebetween adjacent adhesive applicator means which applies a film of adhesive to each of the applicator rollers for coating on respective sides of a substrate web. The apparatus includes a pivotal arm which contains a first laminating roller which forms a nip with the first applicator roller so that a laminating web may be fed thereover to engage the adhesive on one side of the substrate. In addition, a second laminating roller is contained by the pivotal arm and it may be brought into association with the first laminating roller to form a third roller nip so that a second liner may be laminated to the adhesive on the opposite face of the substrate. In accordance with the method of the invention the substrate is fed between the first roller nip and is coated on each side with an adhesive to a predetermined level which is regulated by the rotational speeds of the applicator rollers and it is thereafter directed over a portion of the surface of the first laminating roller so that the laminating web which is fed thereon is bonded to the adhesive on the one side of the substrate. The second liner is then fed on the opposite face with a second laminating roller which is arranged in association with the first laminating roller to define a third nip therewith. The rotational speeds of the laminating rollers in their adjustable positions relative to each other and to the applicator rollers permit selection of the film amount of adhesive and the bonding which is effected between the liners and the substrate.

7 Claims, 1 Drawing Figure

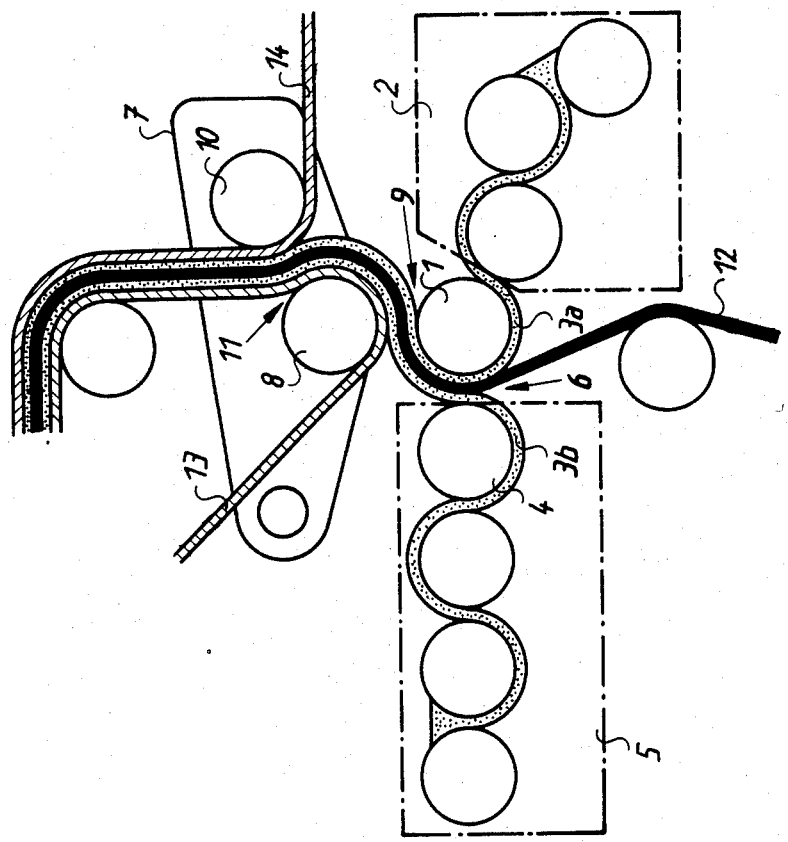

APPARATUS AND METHOD FOR MANUFACTURING A SANDWICH WEB

This invention relates in general to the construction of bonded sheet material products and in particular to a new and useful apparatus and method for manufacturing a sandwich web.

The invention concerns a method for the manufacture of a sandwich web in which each side of a substrate web is coated by means of an adhesive applicator and thereafter combined with the liner web and bonded, as well as a device to implement the process. DE-AS No. 12 72 410 discloses a sandwich web manufacturing process in which an aluminum foil is led through a tank containing a solvent and then over a guide roller to a laminating station where a plastic foil softened by the solvent is pressed onto one side of the said foil.

In this method, it is not possible to coat a substrate web with an adhesive since a device essential for metering the applied coating is not provided.

U.S. Pat. No. 4,055,453 discloses a further sandwich web manufacturing method for the production of roofing felt in which the inner surfaces of the outer layers of a three-ply laminate are coated with adhesive and are brought together and bonded by one and the same roller.

It is not possible with either of the above-described methods to completely affect the rolling behavior of the finished sandwich web since it is generally known that a web of material coated with adhesive cannot be withdrawn in an exactly tangential manner from any roller that comes into contact with the adhesive film. Depending on its own properties and on those of the adhesive, the web of material will be deflected from the tangential path to a greater or lesser extent in the direction of its circumferential motion. For this reason it is not possible to perfectly control the tensions of the individual webs of material.

SUMMARY OF THE INVENTION

The present invention provides a method with which it is possible to combine the individual webs under perfect tension control into a sandwich web in a single operation.

According to the present invention the substrate web is coated with a film of adhesive on both sides in a first roller nip formed between two applicator rollers which are each advanceable against the other. The substrate web is thereafter led together with a first liner web through the nip formed by one of the applicator rollers and a first laminating roller and with a second liner web through a third roller nip formed by the first laminating roller and a second laminating roller and bonded. The directions of each of the webs which approach the device and which form part of the sandwich web are arranged before entry into the roller nip by the corresponding roller. The webs are continuously supported by roller surfaces until the third roller nip has been passed.

The method according to the present invention makes it possible for every web of the sandwich web to pass through the apparatus continuously over roller surfaces; to transfer an accurately and separately metered film of adhesive to both sides of a substrate web within the confines of the same roller nip; to determine a fixed departure line for the adhesive-coated substrate web; to influence the tension of each individual web up to the location at which they are laminated; and to regulate the pressing forces developed in the roller nips between the rollers according to requirements.

Accordingly it is an object of the invention to provide an improved apparatus for manufacturing a sandwich web in which a substrate is passed between a first roller nip made up of adjustably spaced apart rotatable applicator rollers which apply a uniform film of adhesive to each side of the substrate and wherein the substrate is then moved into a nip formed between a first laminating roller and one of the applicator rollers to apply a first laminating web to one side of the substrate over the adhesive and then is moved to a nip formed between a second laminating roller and the first laminating roller wherein a second liner is fed over the adhesive on the opposite face of the substrate.

A further object of the invention is to provide a method of manufacturing a sandwich which comprises directing a substrate between a nip formed by cooperating rotatable applicator rollers while supplying these rollers with a uniform coating of adhesive and regulating their speed and spacing so as to form a uniform layer of adhesive on the substrate, thereafter passing the adhesive face into the nip between one of the applicator rollers and a first laminating roller over which a laminating web is fed to engage the web on the adhesive on one face, and thereafter directing the substrate through the nip formed between the first laminating roller and a second laminating roller over which a second liner is fed to engage the adhesive and bond it to the other face of the substrate.

A further object of the invention is to provide an apparatus for manufacturing a sandwich web which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiment of the invention is illustrated.

BRIEF DESCRIPTION OF THE DRAWINGS

In the Drawings:

The only FIGURE is a schematic side-elevational view of an apparatus for forming a sandwich web constructed in accordance with the present invention and in which the thicknesses of the webs and the adhesive films are drawn in a greatly exaggerated manner.

GENERAL DESCRIPTION OF THE PREFERRED EMBODIMENT

Referring to the drawings in particular the invention embodied therein comprises an apparatus for manufacturing a sandwich web which comprises first and second rotatable applicator rollers 1 and 4, means mounting the rollers so as to form an adjustable first roller nip 6 therebetween. Adhesive applicator means in the form of separate adhesive applicators 2 and 5 apply a film of adhesive to each of the applicator rollers 1 and 4. The first rotating laminating roller 8 forms an adjustable second roller nip 9 with the first applicator roller 1. The second rotatable laminating roller 10 forms an adjustable third roller nip with the first laminating roller 8. The invention includes means for directing first and second liner webs 13 and 14 up to the second roller nip and to the third roller nip. In addition the substrate 12 is directed through the first roller nip 6 to pick up a film of adhesive on each side thereof and then through the second roller nip 9 to engage the first liner web over the adhesive on one side of the substrate and then through the third roller nip 11 to engage the second liner 14 over the adhesive on the opposite side of the substrate.

In the schematically-represented apparatus, a first applicator roller 1 to which circumferential motion can be imparted by a drive system is mounted at a fixed location in the walls of the machine. A first adhesive applicator meachanism 2 is arranged so that it can be advanced in a conventional manner toward the first applicator roller 1, wherein said adhesive applicator mechanism 2 transfers an accurately metered film of adhesive 3a to the first applicator roller 1.

A second applicator roller 4, also coatable with an accurately metered film of adhesive 3a can be separately driven and is acccommodated in a second adhesive applicator mechanism 5 which is slidably mounted in such a manner that an adjustable first roller nip 6 can be established between the first applicator roller 1 and the second applicator roller 4.

A first laminating roller 8 to which circumferential motion can be imparted by a drive system is located in a swivellably mounted arm 7 in such a manner that a second adjustable roller nip 9 can be established between the said first lamination roller 8 and the first applicator roller 1.

A second lamination roller 10 to which circumferential motion can be imparted by a drive system is also located in arm 7 in such a manner that it can be advanced with known means toward the first laminating roller 8 with which it forms a third adjustable roller nip 11.

The two applicator rollers 1 and 4 and the two laminating rollers 8 and 10 can be driven and advanced such that individual speed corrections can be made to influence web tensions and individual pressing forces can be developed in the roller nips 6, 9 and 11.

Substrate web 12 to be laminated is guided over first applicator roller 1 into first roller nip 6 wherein said substrate web is coated on each side with separately and accurately metered films of adhesive 3a and 3b. After first roller nip 6, substrate web 12 is guided over applicator roller 1 to the second roller nip 9 whereby the substrate web 12 is simultaneously released in a defined manner from the surface of the second applicator roller 4. A first liner web 13 is guided over first laminating roller 8 into roller nip 9 and bonded to the substrate web 12 during which operation the tensions of the two webs 12 and 13 can be accurately matched to each other at the instant of bonding by means of speed corrections. After the second roller nip 9, bonded webs 12 and 13 are guided over the first laminating roller 8 to the third roller nip 11 and the unbonded side of substrate web 12 is cleanly released from the surface of first applicator roller 1.

A second liner web 14 is guided over second laminating roller 10 into roller nip 11 and bonded to substrate web 12 to form a three-ply laminate during which operation the tensions of the two webs at the instant of bonding can be adjusted by influencing the roller behavior of the finished sandwich web by correcting the speed of second laminating roller 10.

Each of the two adhesive applicator mechanisms 2, 5 is separately adjustable in an accepted manner so that it is perfectly feasible to manufacture a sandwich web with only two webs of material.

In order to permit the use of the greatest range of web materials and adhesives for the method in the present invention, it is necessary that the surface temperatures of all rollers can be controlled. This can be effected in an accepted but not specially indicated manner, either by heating or cooling as required.

While a specific embodiment of the invention has been shown and described in detail to illustrate the application of the principles of the invention, it will be understood that the invention may be embodied otherwise without departing from such principles.

What is claimed is:

1. An apparatus for manufacturing a sandwich web of foil comprising:
   a first rotatable applicator roller;
   a second rotatably applicator roller;
   a means for mounting said first and second applicator roller so as to form an adjustable first roller nip therebetween;
   an adhesive applicator means for applying a film of adhesive to each of said first and second applicator rollers;
   a first rotatable laminating roller, said first rotatable laminating roller mounted so that an adjustable second roller nip is formed with said first applicator roller;
   a second rotatable laminating roller, said second rotatable laminating roller mounted so that an adjustable third roller nip is formed with said first laminating roller;
   a means for directing a first liner web through said second roller nip;
   a means for directing a second liner web through said third roller nip;
   a means for directing a substrate web through said first roller nip so as to pick up a film of adhesive on each side thereof and then through said second roller nip so that said first liner engages said film of adhesive on one side of said substrate web, and then through said third roller nip so that said second liner engages said film of adhesive on the other side of said substrate web.

2. An apparatus according to claim 1, wherein each of said applicator rollers is adjustable relative to each other and to said adhesive applicator means.

3. An apparatus according to claim 1, wherein said adhesive applicator means comprises a plurality of applicator rollers which are retractable.

4. An apparatus according to claim 1, wherein each of said applicator rollers and said laminating rollers are separately driven.

5. An apparatus according to claim 1, wherein the surface temperatures of all of said applicator rollers and said laminating rollers are controllable.

6. A method for the manufacturing of a sandwich web using a pair of applicator rollers which are coatable with adhesive and are separately rotatably driven and arranged so as to form a first roller nip therebetween and using a plurality of laminating rollers one of which may be arranged serially to form a nip with one of the applicator rollers and the other of which may be arranged serially to form a nip with said one laminating roller, comprising directing a substrate serially between the first roller nip between the applicator rollers while continuing to apply a film of adhesive over each of the applicator rollers and feeding it to respective sides of said substrate, directing the adhesive coated sides of the substrate in the nip between a first laminating roller and one of the applicator rollers while feeding a first lining web over the associated first laminating roller to bond it to the adhesive on the adjacent side of the substrate, releasing the other adhesively coated side from the applicator roller on the opposite side of the substrate and passing from the substrate through the nip between the first laminating roller and the other of said laminating rollers while feeding a second liner onto the adhesive on the opposite face of the substrate.

7. A method according to claim 6, including driving the applicator rollers at a speed to regulate the film of adhesive deposited thereon and locating the first laminating roller so that the clearance between the applicator roller and the first laminating roller is regulated.

* * * * *